(12) United States Patent
Avraham et al.

(10) Patent No.: US 12,493,427 B1
(45) Date of Patent: Dec. 9, 2025

(54) DATA STORAGE DEVICE AND METHOD FOR USING MULTIPLE MODELS FOR PREDICTING A READ THRESHOLD

(71) Applicant: Sandisk Technologies, Inc., Milpitas, CA (US)

(72) Inventors: David Avraham, San Jose, CA (US); Eran Sharon, Rishon Lezion (IL); Alexander Bazarsky, Holon (IL); Ariel Navon, Revava (IL)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/777,942

(22) Filed: Jul. 19, 2024

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC ..... G06F 3/0679; G06F 3/0655; G06F 3/0604
See application file for complete search history.

(56) References Cited

U.S. PATENT DOCUMENTS

| | | | |
|---|---|---|---|
| 6,154,157 A | 11/2000 | Wong | |
| 7,876,671 B2 | 1/2011 | Pimlott | |
| 7,995,387 B2 | 8/2011 | Sharon et al. | |
| 8,374,026 B2 | 2/2013 | Sharon et al. | |
| 8,782,495 B2 | 7/2014 | Alrod et al. | |
| 9,070,479 B2 | 6/2015 | Sharon et al. | |
| 9,141,475 B2 | 9/2015 | Alrod et al. | |
| 9,431,120 B1 | 8/2016 | Tuers | |
| 9,697,905 B2 | 7/2017 | Sharon et al. | |
| 9,728,263 B2 | 8/2017 | Sharon | |
| 9,996,281 B2 | 6/2018 | Sharon et al. | |
| 10,379,739 B1 * | 8/2019 | Bazarsky | G11C 11/5642 |
| 10,418,097 B2 | 9/2019 | Avraham et al. | |
| 10,475,523 B2 | 11/2019 | Sharon et al. | |
| 10,811,091 B2 | 10/2020 | Bazarsky et al. | |
| 10,991,444 B1 | 4/2021 | Bazarsky et al. | |
| 11,081,474 B1 | 8/2021 | Hoang et al. | |
| 11,150,825 B2 | 10/2021 | Kashyap et al. | |
| 11,244,732 B2 | 2/2022 | Sharon et al. | |
| 2012/0063227 A1 | 3/2012 | Weingarten et al. | |

(Continued)

FOREIGN PATENT DOCUMENTS

CN 119537274 A 2/2025

OTHER PUBLICATIONS

Non-final Office Action mailed Jun. 16, 2025 for U.S. Appl. No. 18/220,363.

(Continued)

*Primary Examiner* — Jane W Benner
(74) *Attorney, Agent, or Firm* — Crowell & Moring LLP (57) ABSTRACT

A data storage device can generate a recommended read threshold value using a model that was trained under a plurality of conditions. However, such a model may result in an undesirable bit error rate or programming latency. If that should occur, the data storage device can use a different model trained under a condition similar to a current condition of the data storage device. In addition to avoiding an undesirable bit error rate or programming latency, this can result in improved throughput, improved quality of service, and reduced power consumption.

20 Claims, 7 Drawing Sheets

(56) References Cited

U.S. PATENT DOCUMENTS

| | | |
|---|---|---|
| 2014/0056066 A1 | 2/2014 | Baum et al. |
| 2014/0136927 A1 | 5/2014 | Li |
| 2016/0170871 A1* | 6/2016 | Hyun ............... G06F 3/0653 |
| | | 711/103 |
| 2017/0139590 A1 | 5/2017 | Hsu et al. |
| 2017/0162268 A1 | 6/2017 | Chen et al. |
| 2018/0011753 A1* | 1/2018 | Alhussien ......... H03M 13/6325 |
| 2018/0293029 A1 | 10/2018 | Achtenberg |
| 2018/0293174 A1 | 10/2018 | Song |
| 2019/0189236 A1 | 6/2019 | Poliakov et al. |
| 2019/0267054 A1 | 8/2019 | Thalaimalaivanaraj |
| 2019/0371402 A1 | 12/2019 | Lin |
| 2020/0042240 A1* | 2/2020 | Therene ............... G06F 16/387 |
| 2020/0192791 A1 | 6/2020 | Yang |
| 2020/0364108 A1 | 11/2020 | Froelich et al. |
| 2020/0364118 A1 | 11/2020 | Sun |
| 2021/0241845 A1 | 8/2021 | Li et al. |
| 2021/0334035 A1 | 10/2021 | Sheperek et al. |
| 2022/0027083 A1* | 1/2022 | Zuolo ............... G06F 3/0679 |
| 2022/0027721 A1 | 1/2022 | Zhang et al. |
| 2022/0075561 A1 | 3/2022 | Peltz et al. |
| 2022/0076738 A1 | 3/2022 | Bazarsky |
| 2022/0121387 A1 | 4/2022 | Ha et al. |
| 2022/0121985 A1 | 4/2022 | Lloyd et al. |
| 2022/0254419 A1 | 8/2022 | Kim et al. |
| 2023/0410869 A1* | 12/2023 | Sharon ............... G11C 11/1673 |
| 2025/0118376 A1 | 4/2025 | Shenoy |

OTHER PUBLICATIONS

Non-final Office Action mailed Jun. 16, 2025 for U.S. Appl. No. 18/664,514.

Non-final Office Action mailed Jun. 16, 2025 for U.S. Appl. No. 18/242,061.

U.S. Appl. No. 17/838,481, filed Jun. 13, 2022, entitled "Storage System and Method for Inference of Read Thresholds Based on Memory Parameters and Conditions."

U.S. Appl. No. 17/899,073, filed Aug. 30, 2022, entitled "Storage System and Method for Implementation of Symmetric Tree Models for Read Threshold Calibration."

U.S. Appl. No. 18/220,363, filed Jul. 11, 2023, entitled "Storage System and Method for Circuit-Bounded-Array-Based Time and Temperature Tag Management and Inference of Read Thresholds."

U.S. Appl. No. 18/239,302, filed Aug. 29, 2023, entitled "Data Storage Device and Method for Inferring a Read Threshold Using a Time Tag Determination."

U.S. Appl. No. 18/242,061, filed Sep. 5, 2023, entitled "Data Storage Device and Method for Predicting Future Read Thresholds."

U.S. Appl. No. 18/800,681, filed Aug. 12, 2024, entitled "Data Storage Device and Method for Combining Prediction Models for Read Threshold Calibration."

U.S. Appl. No. 18/664,514, filed May 15, 2024, entitled "Data Storage Device and Method for Generating Read Threshold Voltages."

U.S. Appl. No. 18/658,074, filed May 8, 2024, entitled "Data Storage Device and Method for Predictive Read Threshold Calibration."

U.S. Appl. No. 18/772,563, filed Jul. 15, 2024, entitled "Data Storage Device and Method for Using Modular Models for Inferring a Read Threshold."

Non-final Office Action dated Oct. 8, 2025 for U.S. Appl. No. 18/664,514.

* cited by examiner

DATA STORAGE DEVICE AND METHOD FOR USING MULTIPLE MODELS FOR PREDICTING A READ THRESHOLD

BACKGROUND

One of the main challenges introduced by NAND process shrinking and three-dimensional stacking is maintaining process uniformity. In addition, data storage devices may need to support a wide range of operational conditions (such as different program/erase cycles, retention times, and temperatures), which can lead to increased variability between memory dies, blocks, and pages across the different operational conditions. Due to these variations, the read thresholds (RT) used for reading a memory page in some data storage devices are not fixed and can change significantly as a function of the physical location and the operational conditions, especially for less-mature memory nodes.

DETAILED DESCRIPTION

The following embodiments generally relate to a data storage device and method for using multiple models for predicting a read threshold. In one embodiment, a data storage device is provided comprising a memory and one or more processors. The one or more processors, individually or in combination, are configured to: use a model trained under a plurality of conditions to generate a read threshold value; track a parameter resulting from using the read threshold value to read the memory; and in response to a value of the parameter exceeding a threshold: use a different model that was trained under a condition similar to a current condition of the data storage device to generate a new read threshold value; and use the new read threshold value to read the memory.

In another embodiment, a method is provided that is performed in a data storage device comprising a memory. The method comprises: using a model trained under a first condition to generate a first read threshold value; tracking a number of program/erase cycles; and in response to the number of program/erase cycles exceeding a threshold for a current condition of the data storage device: selecting a different model trained under a different condition to generate a different read threshold value; and using the different read threshold value to read the memory.

In yet another embodiment, a data storage device is provided comprising: a memory; and means for: using a model trained under a plurality of conditions to generate a read threshold value; in response to a bit error rate or read latency value exceeding a threshold, using a different model that was trained under a condition similar to a current condition of the data storage device to generate a new read threshold value; and using the new read threshold value to read the memory.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a non-volatile device that stores data. Examples of DSDs include, but are not limited to, hard disk drives (HDDs), solid state drives (SSDs), tape drives, hybrid drives, etc. Details of example DSDs are provided below.

Figures 1A, 1B:
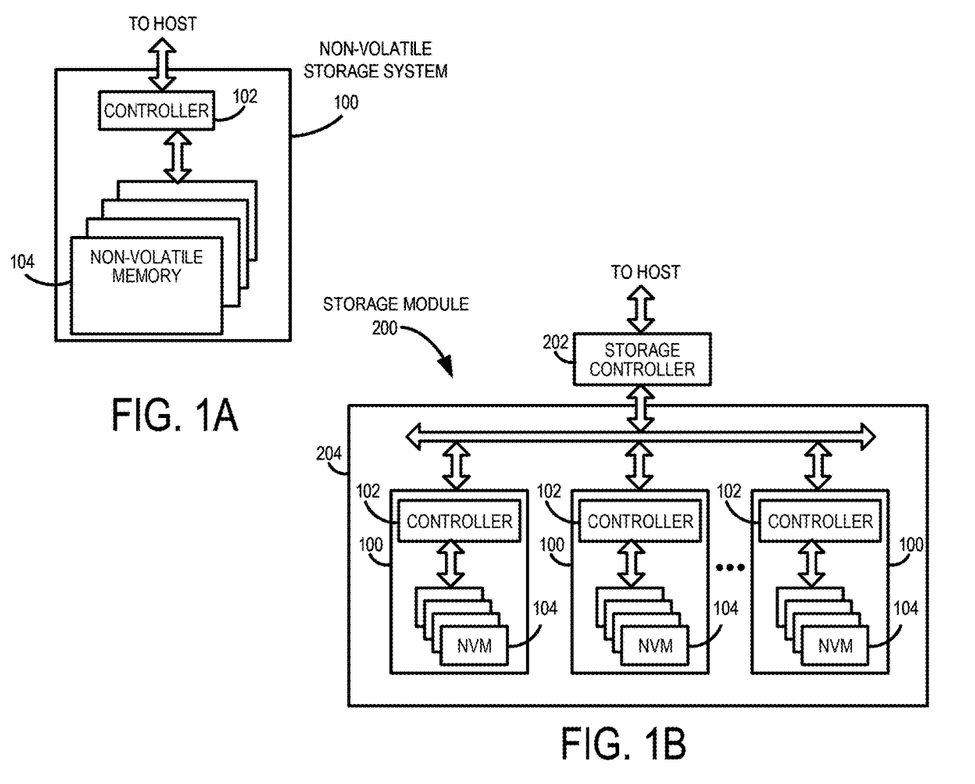
FIG. 1A is a block diagram of a data storage device of an embodiment.
FIG. 1B is a block diagram illustrating a storage module of an embodiment.
Figure 1C:
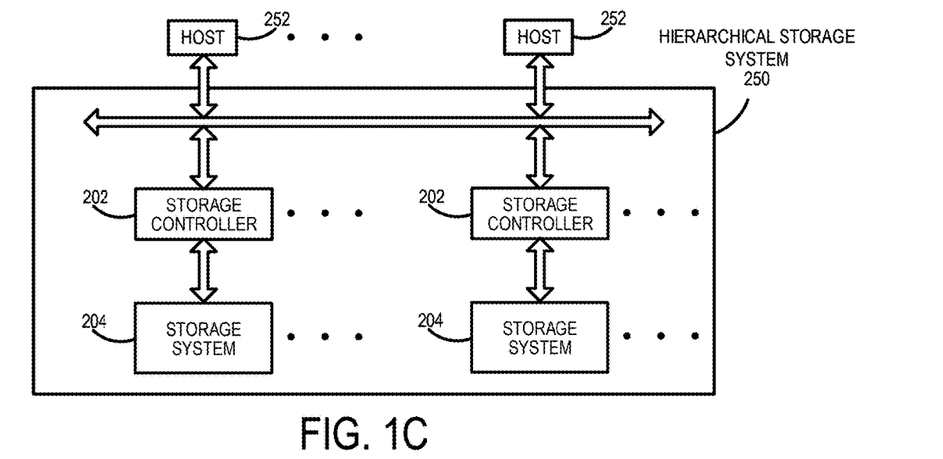
FIG. 1C is a block diagram illustrating a hierarchical storage system of an embodiment.

Examples of data storage devices suitable for use in implementing aspects of these embodiments are shown in FIGS. 1A-1C. It should be noted that these are merely examples and that other implementations can be used. FIG. 1A is a block diagram illustrating the data storage device 100 according to an embodiment. Referring to FIG. 1A, the data storage device 100 in this example includes a controller 102 coupled with a non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. The controller 102 interfaces with a host system and transmits command sequences for read, program, and erase operations to non-volatile memory die 104. Also, as used herein, the phrase "in communication with" or "coupled with" could mean directly in communication/coupled with or indirectly in communication/coupled with through one or more components, which may or may not be shown or described herein. The communication/coupling can be wired or wireless.

Figure 2A:
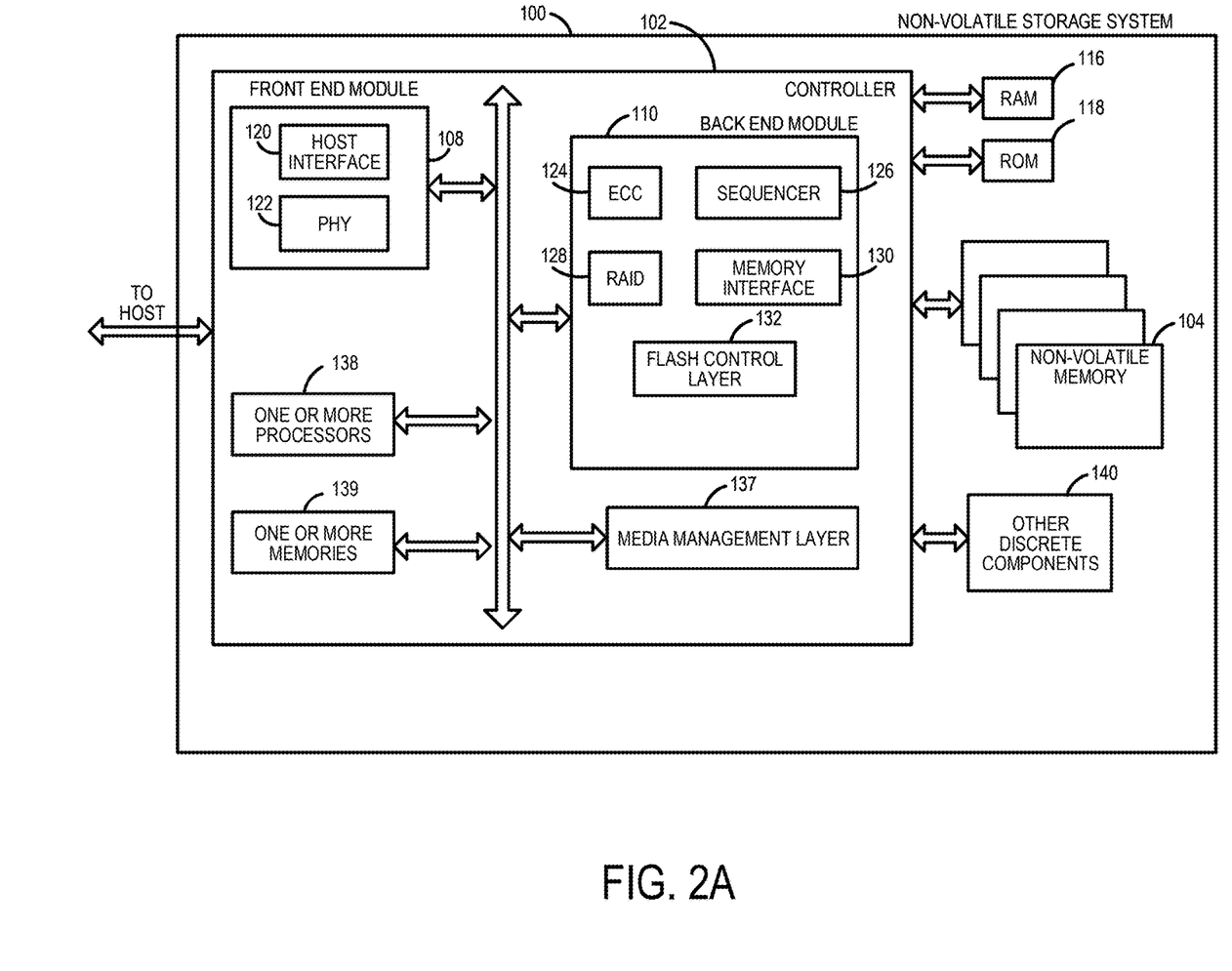
FIG. 2A is a block diagram illustrating components of the controller of the data storage device illustrated in FIG. 1A according to an embodiment.

The controller 102 (which may be a non-volatile memory controller (e.g., a flash, resistive random-access memory (ReRAM), phase-change memory (PCM), or magnetoresistive random-access memory (MRAM) controller)) can include one or more components, individually or in combination, configured to perform certain functions, including, but not limited to, the functions described herein and illustrated in the flow charts. For example, as shown in FIG. 2A, the controller 102 can comprise one or more processors 138 that are, individually or in combination, configured to perform functions, such as, but not limited to the functions described herein and illustrated in the flow charts, by executing computer-readable program code stored in one or more non-transitory memories 139 inside the controller 102 and/or outside the controller 102 (e.g., in random access memory (RAM) 116 or read-only memory (ROM) 118). As another example, the one or more components can include circuitry, such as, but not limited to, logic gates, switches, an application specific integrated circuit (ASIC), a programmable logic controller, and an embedded microcontroller.

In one example embodiment, the non-volatile memory controller 102 is a device that manages data stored on non-volatile memory and communicates with a host, such as a computer or electronic device, with any suitable operating system. The non-volatile memory controller 102 can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware (and/or other metadata used for housekeeping and tracking) to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card-based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, double-data-rate (DDR) interface, or serial attached small scale compute interface (SAS/SCSI). Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCOE) interface. In one embodiment, the system illustrated in FIG. 1C may be a rack mountable mass storage system that is accessible by multiple host computers, such as would be found in a data center or other location where mass storage is needed.

Referring again to FIG. 2A, the controller 102 in this example also includes a front-end module 108 that interfaces with a host, a back-end module 110 that interfaces with the one or more non-volatile memory die 104, and various other components or modules, such as, but not limited to, a buffer manager/bus controller module that manage buffers in RAM 116 and controls the internal bus arbitration of controller 102. A module can include one or more processors or components, as discussed above. The ROM 118 can store system boot code. Although illustrated in FIG. 2A as located separately from the controller 102, in other embodiments one or both of the RAM 116 and ROM 118 may be located within the controller 102. In yet other embodiments, portions of RAM 116 and ROM 118 may be located both within the controller 102 and outside the controller 102.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. The controller 102 in this example also comprises a media management layer 137 and a flash control layer 132, which controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller are optional components that are not necessary in the controller 102.

Figure 2B:
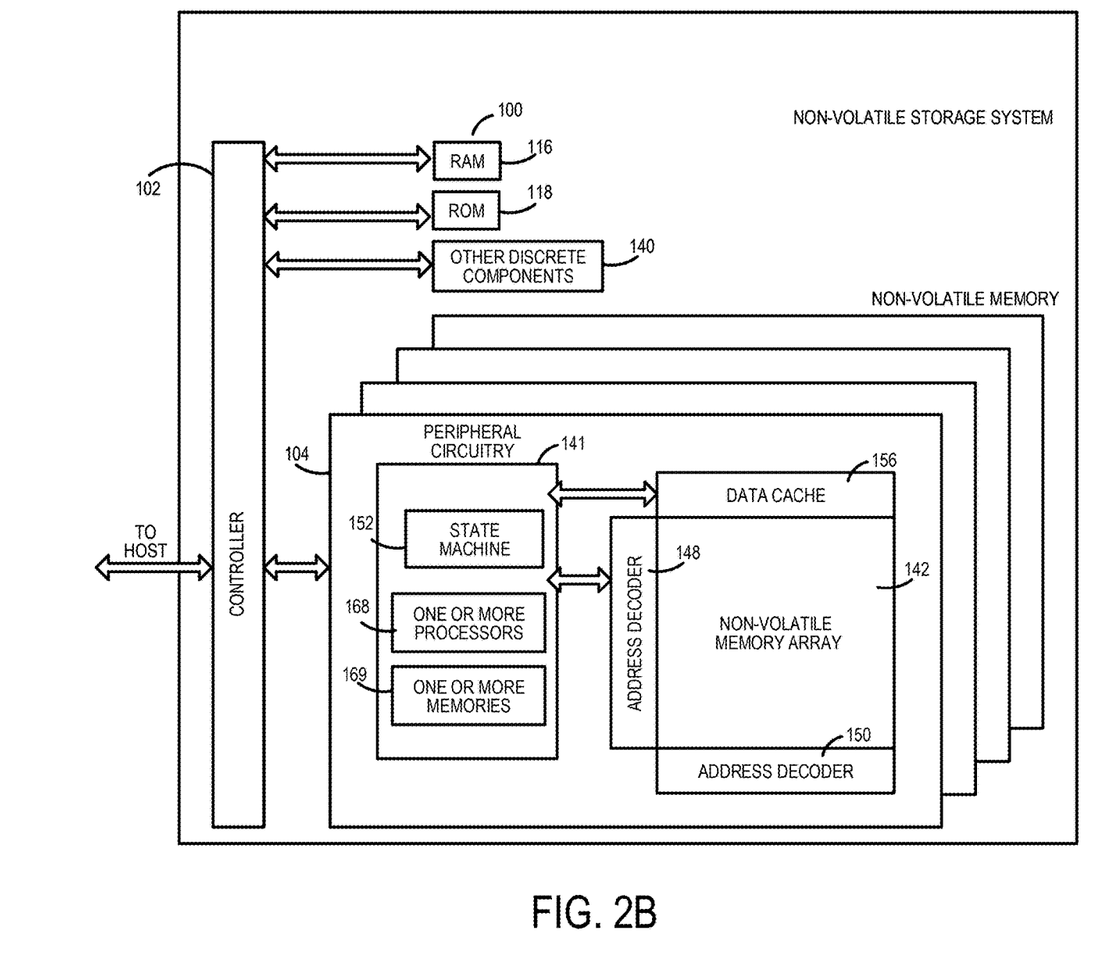
FIG. 2B is a block diagram illustrating components of the data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data and address decoders 148, 150. The peripheral circuitry 141 in this example includes a state machine 152 that provides status information to the controller 102. The peripheral circuitry 141 can also comprise one or more components that are, individually or in combination, configured to perform certain functions, including, but not limited to, the functions described herein and illustrated in the flow charts. For example, as shown in FIG. 2B, the memory die 104 can comprise one or more processors 168 that are, individually or in combination, configured to execute computer-readable program code stored in one or more non-transitory memories 169, stored in the memory array 142, or stored outside the memory die 104. As another example, the one or more components can include circuitry, such as, but not limited to, logic gates, switches, an application specific integrated circuit (ASIC), a programmable logic controller, and an embedded microcontroller.

In addition to or instead of the one or more processors 138 (or, more generally, components) in the controller 102 and the one or more processors 168 (or, more generally, components) in the memory die 104, the data storage device 100 can comprise another set of one or more processors (or, more generally, components). In general, wherever they are located and however many there are, one or more processors (or, more generally, components) in the data storage device 100 can be, individually or in combination, configured to perform various functions, including, but not limited to, the functions described herein and illustrated in the flow charts. For example, the one or more processors (or components) can be in the controller 102, memory device 104, and/or other location in the data storage device 100. Also, different functions can be performed using different processors (or components) or combinations of processors (or components). Further, means for performing a function can be implemented with a controller comprising one or more components (e.g., processors or the other components described above).

Returning again to FIG. 2A, the flash control layer 132 (which will be referred to herein as the flash translation layer (FTL) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
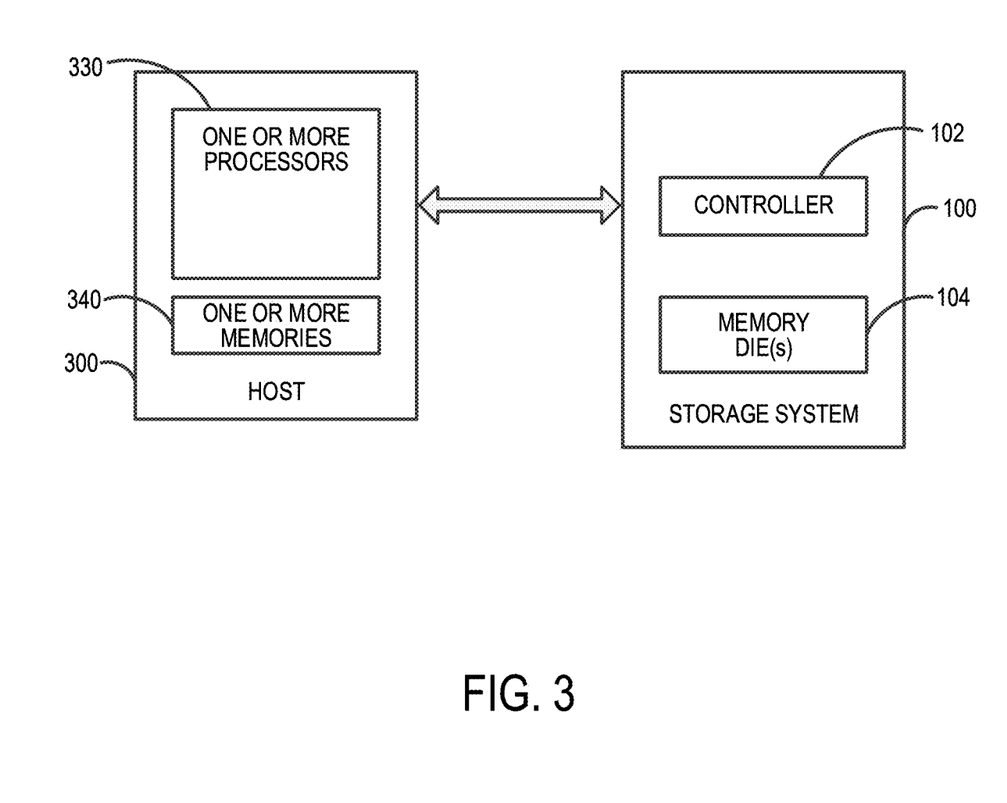
FIG. 3 is a block diagram of a host and a data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises one or more processors 330 and one or more memories 340. In one embodiment, computer-readable program code stored in the one or more memories 340 configures the one or more processors 330 to perform the acts described herein as being performed by the host 300. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

As mentioned above, one of the main challenges introduced by NAND process shrinking and three-dimensional stacking is maintaining process uniformity. In addition, data storage devices may need to support a wide range of operational conditions (such as different program/erase cycles, retention times, and temperatures), which can lead to increased variability between memory dies, blocks, and pages across the different operational conditions. Due to these variations, the read thresholds (RT) used for reading a memory page in some data storage devices are not fixed and can change significantly as a function of the physical location and the operational conditions, especially for less-mature new memory nodes.

Reading with an inaccurate read threshold can lead to a higher bit error rate (BER), which can degrade performance and quality of service (QOS) due to decoding failures, which can require invoking high-latency recovery flows that can cause delays and hiccups in performance. The challenge of maintaining an optimal read threshold can be especially important for enterprise memory systems for which the quality-of-service requirements are very strict and for mobile, internet of things (IoT), and automotive memory systems for which the required range of operational conditions is wide and the frequency of condition changes (e.g., temperature) may be high. The problem is even more difficult during transitions to new, less-mature memory nodes.

Current solutions for read threshold calibration, such as BER estimation scan (BES) and valley search (VS), are high-latency operations aimed at optimizing read threshold for a specific wordline, which is good for rare read recovery flows in cases of failure to decode the data but may not be suitable for frequent operations in case of frequent read threshold changes. Hence, in order to cope with this issue, Flash memory systems can implement read threshold management schemes that try to track read threshold changes in the background via a maintenance process to ensure that appropriate read thresholds are used when the host issues a read command.

One approach is to track the read threshold per group of blocks that share the same conditions. More specifically, blocks that are written roughly at the same time and temperature are grouped into time and temperature (TT) groups. Read thresholds are tracked for each time-and-temperature group, usually acquired on some representative wordline from a block within the group. When the host performs a read operation, the read threshold associated with the time-and-temperature group corresponding to the read block are used, where additional adaptation to the read threshold, according to the specific read wordline, is performed based on pre-calibrated wordline zoning tables.

Some read threshold management schemes may not adequately track the read threshold under frequently-changing conditions and high variations between memory pages. Various solutions to address that issue are possible. For example, U.S. patent application Ser. No. 17/838,481, filed Jun. 13, 2022, which is hereby incorporated by reference, describes a read threshold calibration method that applies a machine learning (ML) prediction model, including specifically a system and method for inferring an optimal read threshold from various available information, including time-and-temperature group information, temperature information, bit error rate (BER) information, program-erase count (PEC) information, and physical page location.

As another example, U.S. patent application Ser. No. 17/899,073, filed Aug. 30, 2022; Ser. No. 18/220,363, filed Jul. 11, 2023; and Ser. No. 18/242,061, filed Sep. 5, 2023, which are hereby incorporated by reference, describe a method that allows for implementation of an inference engine for faster and more-accurate acquisition of read thresholds. In one embodiment described there, a binary tree model is used to efficiently store only a subset of relevant correction data. In addition, it does not need to directly read from the memory to perform threshold calibrations; hence, it is much faster than BES/VS-based calibrations. The unique structure of the binary tree allows for a fast and low area and power solution.

Additionally, U.S. patent application Ser. No. 18/658,074, filed May 8, 2024, which is hereby incorporated by reference, describes a hardware implementation. A hardware implementation can impose strict limitations on the complexity of the implemented prediction model. Accordingly, an efficient prediction-model-based collection of symmetric trees can be used, as described in the patent applications references above. However, although a symmetric prediction trees model may be capable of describing complex non-linear functions of the input features, it can have an inherent downside of being discreet (non-continuous). This property of random-forest models can limit prediction accuracy as it has only a finite number of potential output values. The impact of this limitation on model performance can increase as the hardware requirements become more strict.

As described above, read threshold selection can be a complicated task that may be highly suitable for machine learning techniques. As such, an artificial intelligence-based read threshold (ART) mode can be used to replace legacy read thresholds schemes. One implementation of ART is a multi-model inference engine that is capable of inferring from several different types of models in real-time with high accuracy and minimal latency. Other partial implementations can include firmware derivatives of this approach.

Current approaches to building a prediction module that provides read thresholds include a one-loaded model. Since the RAM allocation at the hardware implementing the ART module for prediction of the read thresholds can be limited, there is an inherent shortage of RAM room for supporting all specified conditions and requirements. Moreover, the dataset collected for training an ART model to provide optimal read levels can sample the feature space in a way that compromises its representation for different conditions. For example, one approach can include collecting databases from different conditions (e.g., at beginning of life (BOL), middle of life (MOL), and end of life (EOL) of the data storage device 100. The produced model can be a compromise between these conditions (e.g., due to the limited model RAM size, as well as limited focus on the data set). Moreover, it can be desired to optimize read thresholds for all different working points at once. However, there may not be clear criteria for the optimized working point (i.e., the same thresholds can fit both frequent low-bit-error-rate (BER) cases (e.g., 0-2 Sigma), as well as rare high-BER cases (e.g., 4-5 Sigma).

So, a read threshold prediction model can be limited by allocated volatile memory (e.g., RAM) size, as well as by a diverse dataset that is supposed to cover various device conditions and requirements. The performance of a model targeted to optimize the read threshold of a certain condition and/or to optimize a certain part of the cell population (low/median/high Sigma) can improve the performance achieved by the compromised all-in-one model in prior approaches. Still, there is a need to find a way to achieve this goal without increasing the allocated RAM size for the model and, as a result, the size and cost of the dedicated hardware module. That is, it can be beneficial to allow using different read threshold prediction models that each can be focused on specific use cases, conditions, and requirements without exceeding allocated RAM size and cost budgets.

In one embodiment, a multi-model system is provided for flexible read threshold prediction that is adapted to provide the best performance on specific conditions and/or requirements without increasing the dedicated RAM capacity. In this embodiment, several flavors of such prediction models are stored (e.g., in the memory 104 of the data storage device 100 or in a host memory, such as a host memory buffer (HMB)), and the controller 102 of the data storage device 100 chooses the model that is most appropriate for the current conditions and requirements. The choice can be according to the model that was trained under similar conditions (i.e., features ranges/values) to the current conditions.

In one example implementation, several prediction models for read thresholds are stored, and each model is optimized for different conditions/working-points. The most-appropriate model can be used according to current conditions. Also, the most-similar model type to the current condition/working-point can be used as a preliminary stage to replace to the most-appropriate model. (A similar condition can refer to a condition that is closer to a current condition than a condition under which a given model was trained.) Additional optimizations can be used. For example, the host memory buffer (HMB) can be selectively used for accelerating the loading of such read-thresholds models. Also, different sizes of models can be used according to current BER level and/or firmware requirement (e.g., as a "heroics" decoding step in case of decoding failure). Further, opportunistic trial of different models can be used until improving BER results are seen. This feature can be applied in case of exceeding a pre-defined BER threshold and/or a decoding latency. In another example, after an elapsed period of time, the controller 102 can try to replace the model opportunistically to see if it can achieve better thresholds.

The following paragraphs will illustrate an example embodiment. In this example, the controller 102 selects one of the stored specific-condition-focused models. Such focused models can be, for example, according to one or more of the following criteria: P/E count→BOL/MOL/EOL focused models, models per time pool index, models per read/write typical temperature (e.g., different server farms may work with different base temperatures due to varying requirements and limitations), and models per Sigma region (e.g., one model for frequently very low-BER cases (e.g., 0 Sigma~50% of cases), another model for the mid-BER cases (e.g., 2 Sigma~2% of cases), another model for the rare high-BER events (e.g., 4 Sigma~0.003% of samples or less), and a performance model versus a reliability model (e.g., the first is used for all mainstream reads whereas the second is used for first step of read error handling (REH)).

Figure 4:
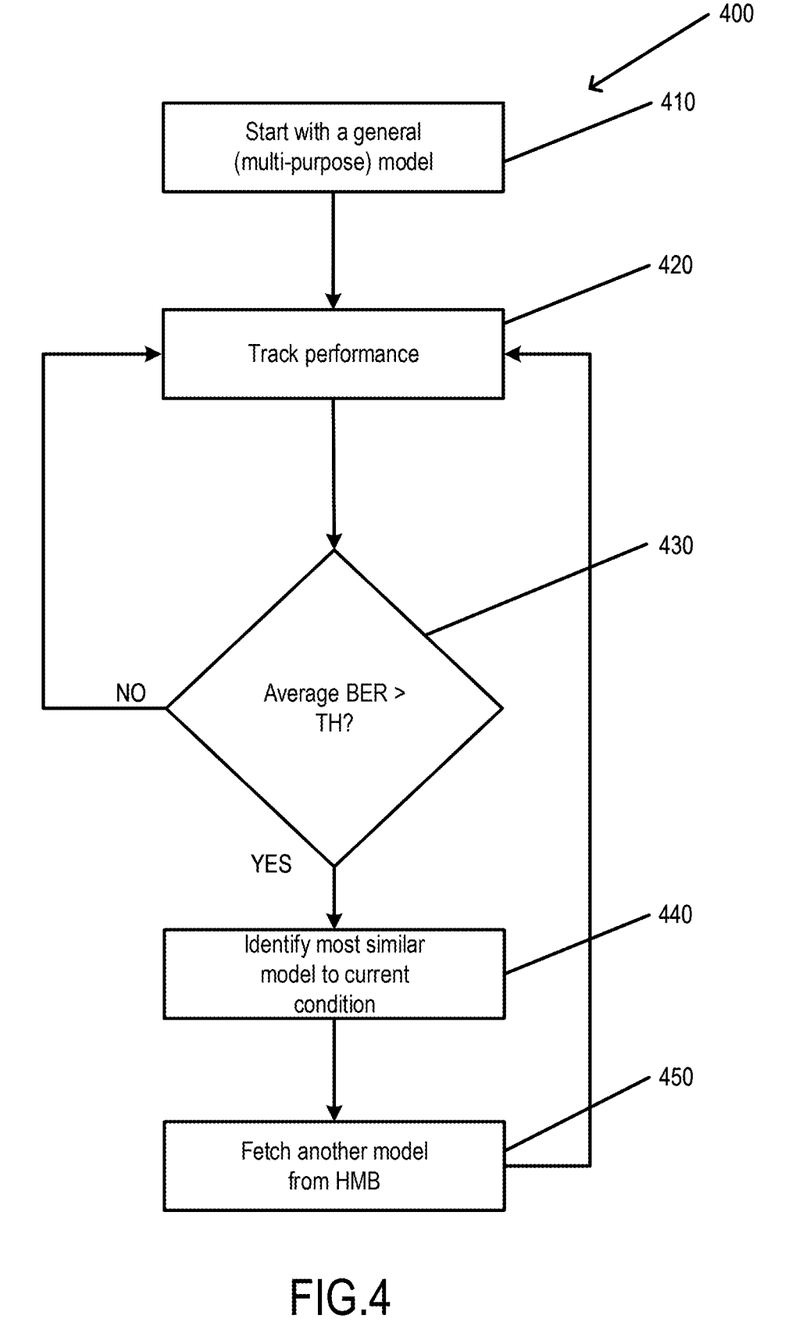
FIG. 4 is a flow chart of a method of an embodiment that uses a multi-condition model as a default.
Figure 5:
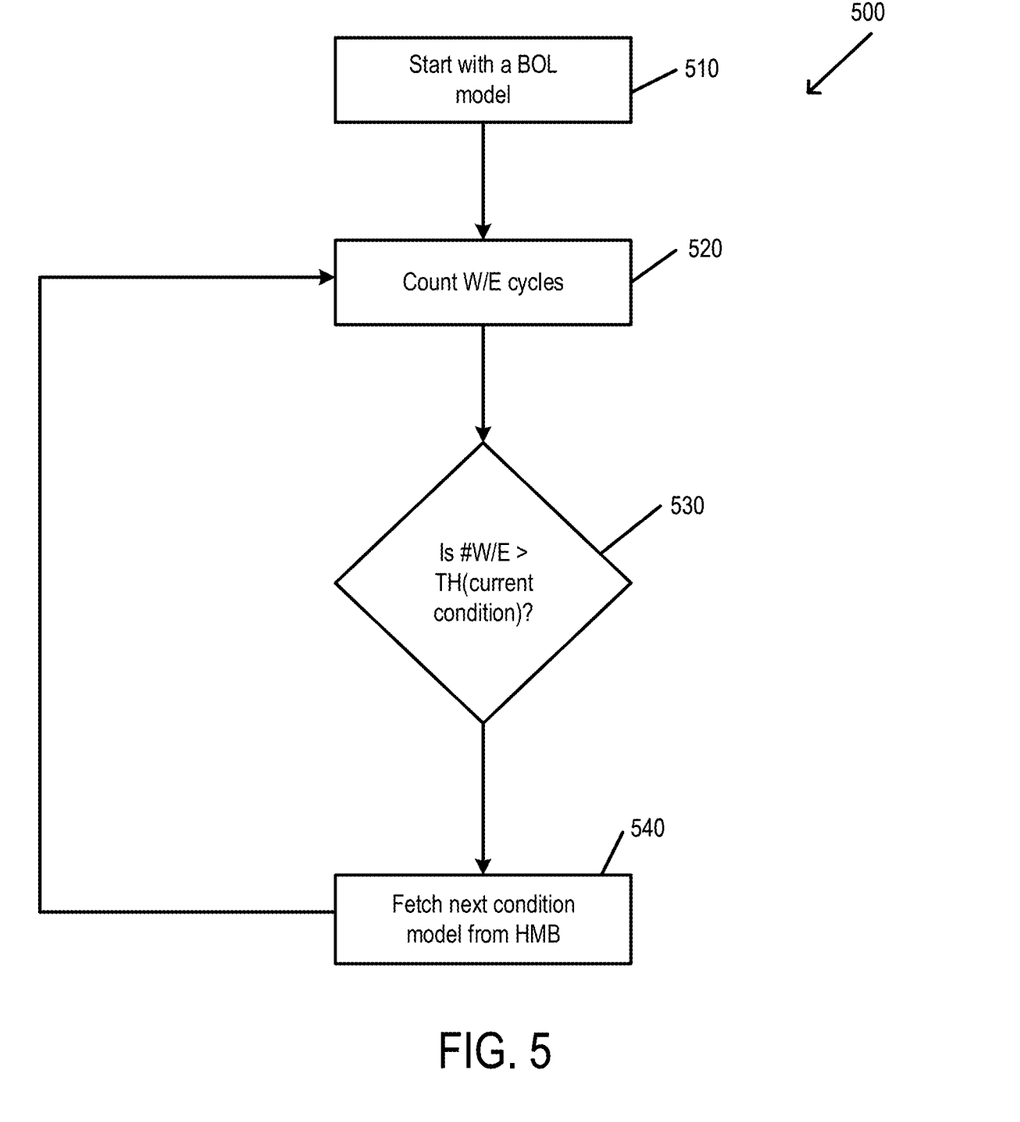
FIG. 5 is a flow chart of a method of an embodiment that starts with a beginning-of-life model and progresses with write/erase cycles.

Turning again to the drawings, FIGS. 4 and 5 are flow charts 400, 500 of methods of two example implementations of these embodiment. Turning first to FIG. 4, FIG. 4 is a flow chart 400 for using a multi-conditional model as a default. As shown in FIG. 4, the controller 102 starts with a general (e.g., multi-purpose) model (410) and tracks performance (420). The default, multi-purpose model can be trained over multiple conditions/datasets, including, for example, BOL/MOL/EOL, with and without data retention, etc. The model can be tuned to provide the best results, for example, at an intermediate BER range (e.g., 2 Sigma points in a Sigma plot). It can be considered an "all-in" model, which is a compromise of all conditions and working points. Performance can be tracked in a pre-defined duration. The controller 102 then determines whether the average bit error rate (BER) is greater than a threshold (TH) (430). (In an alternate embodiment, instead of or in addition to tracking BER, averaged/maximal latency (or another condition indicative of a non-optimal read threshold) can be tracked.) If the average BER is not greater than the threshold, the method loops back to 420. However, if the average BER is greater than the threshold, the controller 102 identifies a model that was trained under a condition similar to the current condition (e.g., the most-similar model) (440). The controller 102 then fetches that other model from the memory (here, the host memory buffer, although a different memory, such as the memory 104 of the data storage device 100, can be used) (450). The use of the new model should decrease the BER.

Turning now to the flow chart 500 in FIG. 5, this method starts with a beginning-of-life (BOL) model (510) and counts write/erase (W/E) cycles (520). The controller 102 determines if the number of W/E cycles is greater than a current condition threshold (TH) (530). If it is, the controller 102 fetches the next condition model from memory (540). The models can be updated in a predefined order (e.g., BOL, then MOL, then EOL).

The identification of the most similar model type to the current condition/working-point can be done in any suitable way. For example, the controller 102 can keep, for each model, typical feature numbers/ranges as a header (e.g., in a dedicated buffer) and calculate a similarity score between current relevant features to the headers of all optional models. Then, the controller 102 can choose the model with the highest similarity score. The relevant features can include, but are not limited to, read temperature, P/E cycles, DR quantization, and other physical conditions. For example, the similarity score can be based on a number of program/erase cycles and/or a read temperature (e.g., Factor1*(current PE-Cycle−Model-i's PE-Cycle)+Factor2*(current Read-Temp−Model-i's Read-temp)).

The controller 102 can also opportunistically try applying several models and choose the one that produces the lowest BER for current data (and conditions). This option does not require holding metadata for the models but can have an overhead (and, therefore, can be applied only as either a heroics decoding mode or on idle times or during periods of low workloads).

The controller 102 can average the scores produced by the methods described in the two paragraphs above over several samples for a predefined period of time and select the best model when it elapses.

Figure 6:
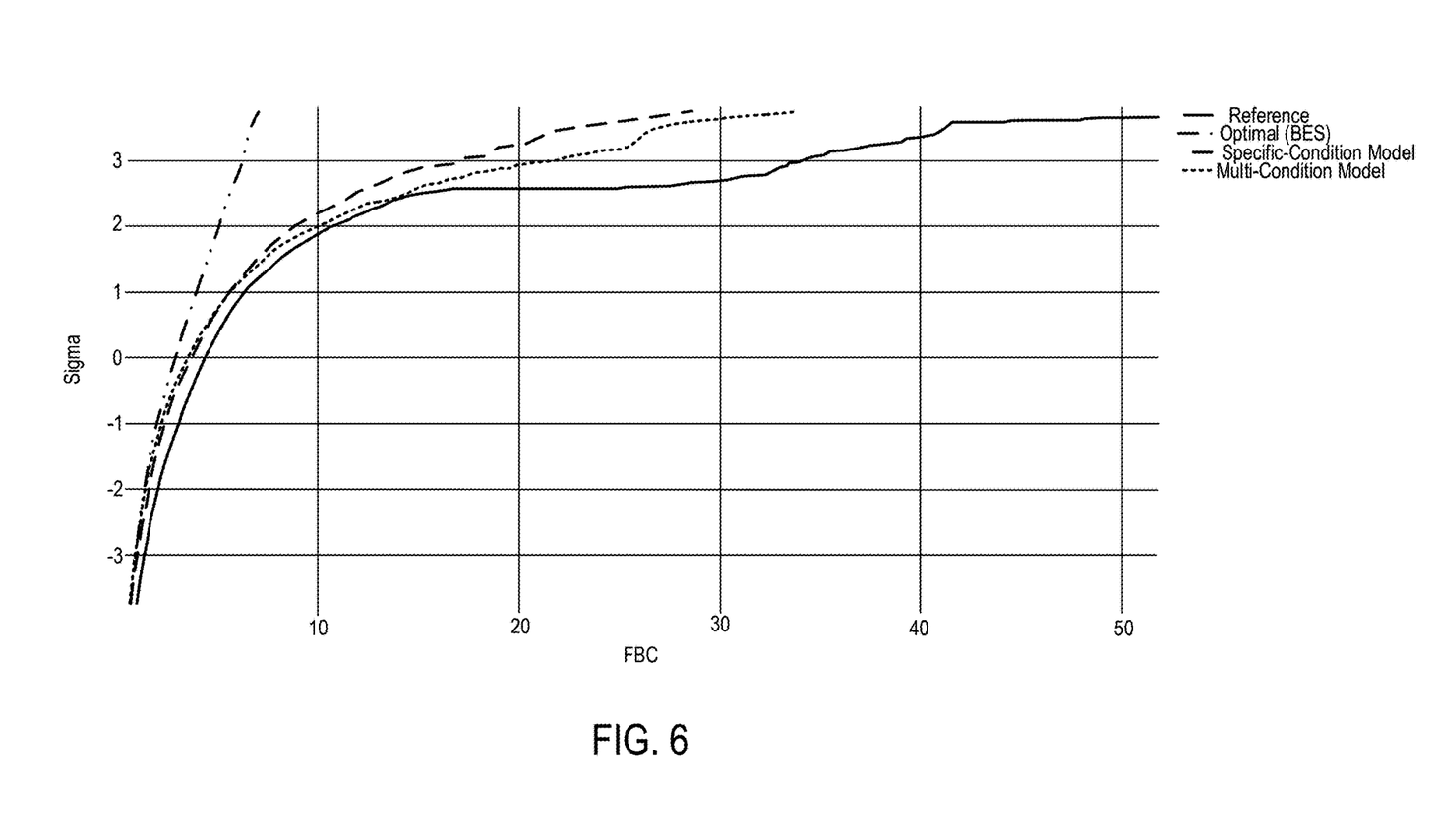
FIG. 6 is a graph of Sigma versus failed bit count (FBC) of an embodiment.

FIG. 6 is a graph of a BER Sigma-plot distribution of predicted read-thresholds when the model was calculated on the specific condition dataset (here, EOL), versus a prediction at which the prediction model was tuned on a general condition dataset (including BOL, MOL, EOL). This figure depicts optimal BES-based read thresholds, a reference, and two ART models of 12 trees. As can be seen in this graph, ART is superior to the non-machine-learned reference, and using a dedicated model for current conditions provides superior results versus the inclusive models.

There are several advantages associated with these embodiments. For example, using dedicated prediction models of read thresholds can provide improved thresholds that will produce a reduced BER without enlarging the hardware, cost, and computation resources (e.g., firmware overhead). Better read thresholds can translate to improved throughput, quality of service, and power consumption (e.g., shorter decoding durations), which can be very important to most product line storage device operations and can be important to end-user requirements.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
    a memory; and
    one or more processors configured to:
        use a model trained under a plurality of conditions to generate a read threshold value;
        track a parameter resulting from using the read threshold value to read the memory; and
        in response to a value of the parameter exceeding a threshold:
            use a different model that was trained under a condition similar to a current condition of the data storage device to generate a new read threshold value, wherein the different model is selected from a plurality of different models for having a similarity score that is highest among the plurality of different models, each of the plurality of different models being trained under a different condition; and
            use the new read threshold value to read the memory;
    wherein the one or more processors comprises (i) a plurality of processors configured individually or in combination or (ii) a single processor.

2. The data storage device of claim 1, wherein the parameter comprises bit error rate.

3. The data storage device of claim 1, wherein the parameter comprises program latency, power consumption, failed bit count, a syndrome weight value, and/or an activation of a high decoding mode.

4. The data storage device of claim 1, wherein the plurality of different models is stored in the memory of the data storage device.

5. The data storage device of claim 1, wherein the plurality of different models is stored in a host memory buffer in a host.

6. The data storage device of claim 1, wherein the similarity score is based on read temperature.

7. The data storage device of claim 1, wherein the similarity score is based on a number of program/erase cycles.

8. The data storage device of claim 1, wherein the similarity score is based on data retention quantization.

9. The data storage device of claim 1, wherein the plurality of conditions comprises at least two of: a beginning-of-life condition, a middle-of-life condition, an end-of-life condition.

10. The data storage device of claim 1, wherein the one or more processors are further configured to use different sizes of models for different values of the parameter and/or increasing sizes of models according to a previous indication of a high bit error rate, a high failed bit count, and/or a program-erase cycle value.

11. The data storage device of claim 1, wherein the one or more processors are further configured to use another one of the plurality of different models until the value of the parameter does not exceed the threshold.

12. The data storage device of claim 1, wherein the one or more processors are further configured to use another one of the plurality of different models after an elapsed period of time.

13. The data storage device of claim 1, wherein the memory comprises a three-dimensional memory.

14. In a data storage device comprising a memory, a method comprising:
    using a model trained under a plurality of conditions to generate a read threshold value;
    tracking a parameter resulting from using the read threshold value to read the memory, and
    in response to a value of the parameter exceeding a threshold:
        using a different model that was trained under a condition similar to a current condition of the data storage device to generate a new read threshold value, wherein the different model is selected from a plurality of different models for having a similarity score that is highest among the plurality of different models, each of the plurality of different models being trained under a different condition; and
    using the new read threshold value to read the memory.

15. The method of claim 14, wherein the different models comprise a model trained under a middle-of-life condition.

16. The method of claim 14, wherein the different models comprise a model trained under an end-of-life condition.

17. The method of claim 14, wherein the different model is selected in a predefined order.

18. The method of claim 14, wherein the different models comprise a model trained under a beginning-of-life condition.

19. The method of claim 17, wherein the memory comprises a three-dimensional memory.

20. A data storage device comprising:
    a memory; and
    means for:
        using a model trained under a plurality of conditions to generate a read threshold value;
        tracking a parameter resulting from using the read threshold value to read the memory, and
        in response to a value of the parameter exceeding a threshold:
            using a different model that was trained under a condition similar to a current condition of the data storage device to generate a new read threshold value, wherein the different model is selected from a plurality of different models for having a similarity score that is highest among the plurality of different models, each of the plurality of different models being trained under a different condition; and
        using the new read threshold value to read the memory.

* * * * *